United States Patent [19]

Oishi et al.

[11] 4,389,690

[45] Jun. 21, 1983

[54] MAGNETIC TAPE CASSETTE INCLUDING A LOCKING MECHANISM

[75] Inventors: Kengo Oishi; Osamu Suzuki; Choji Komiyama, all of Odawara, Japan

[73] Assignee: Fuji Photo Film Co., Ltd., Kanagawa, Japan

[21] Appl. No.: 232,271

[22] Filed: Feb. 6, 1981

[30] Foreign Application Priority Data

Feb. 8, 1980 [JP] Japan .............................. 55-15004[U]

[51] Int. Cl.³ .............................................. G11B 23/04
[52] U.S. Cl. ..................................... 360/132; 360/96.1
[58] Field of Search ................. 360/132, 93, 96.1, 137, 360/95; 242/199, 200

[56] References Cited

U.S. PATENT DOCUMENTS 4,021,856  5/1977  Motoyama et al. .................... 360/93
4,087,844  5/1978  Takahashi et al. ..................... 360/93

Primary Examiner—Alfred H. Eddleman
Attorney, Agent, or Firm—Sughrue, Mion, Zinn, Macpeak and Seas

[57] ABSTRACT

A miniturized video magnetic tape cassette of the type in which a magnetic tape wound on a pair of hubs in the hollow interior of a cassette casing is guided to run across a front opening formed in the casing along a rotatable front cover and in which the tape can be pulled out of the front opening in the cassette. The tape cassette includes locking mechanism having a supporting shaft fixed to a bottom wall of the casing and a hub rotatably mounted on the supporting shaft. An L-shaped locking lever extends from the hub and a first stop extends from the hub in a direction opposite that of the locking lever. A coil spring has a coil portion disposed around an upper portion of a hub in which a slit is formed. A first end of the coil spring is inserted into the slit while the second end abuts against an inner surface of a side wall of the casing.

7 Claims, 5 Drawing Figures

MAGNETIC TAPE CASSETTE INCLUDING A LOCKING MECHANISM

BACKGROUND OF THE INVENTION

The present invention relates to magnetic tape cassettes, and more particularly to an improved video tape cassette.

A typical example of a heretofore known audio tape cassette is a compact cassette made by Phillips Co. and a typical example of a known video tape cassette is a beta format or video home system (VHS) type cassette.

A video tape cassette must have a considerably better and more stable tape running characteristic than an audio tape cassette. In addition, magnetic tape used in a video cassette must be capable of being recorded at a higher recording density and must have a significantly better electromagnetic conversion characteristic than an audio cassette. Accordingly, the possible reduction of the width of a video tape cassette has been limited. The size and weight of presently available video tape cassettes are greater than what is desired.

On the other hand, as magnetic tape and as video recording and reproducing devices have been improved in performance recently, there has been a strong demand for the provision of a portable video system which is more easily portable than a conventional fixed position type video system and which can be used outdoors. This makes it necessary to reduce the size and weight of the video tape cassette.

However, in decreasing the size and weight of the video tape cassette (hereinafter referred to merely as "a cassette"), because of the inherent structural limitations of the cassette, problems remain concerning how to maintain unchanged or improve the running of the magnetic tape, the loading of the magnetic tape in the recording and reproducing device, or the like and how to decrease the manufacturing cost.

FIG. 1 is a plan view showing an example of the arrangement of a tape transport structure in a conventional miniaturized magnetic tape cassette. A pair of hubs 2 and 3 around which a magnetic tape T can be wound are disposed respectively at the right-hand and left-hand sides in the hollow interior of a cassette casing 1. The magnetic tape T between the hubs 2 and 3 passes along tape running paths which are defined by a plurality of guide pins and/or guide rollers 5 which are provided on both sides of a front opening 4 in the cassette casing 1. A turnable cover 7 is pivotally supported on both sides of the cassette casing 1. After the turnable cover 7 is opened, the magnetic tape T loaded across the front opening 4 is pulled out of the front opening 4 with a pulling member provided in the recording and reproducing device so that the recording or reproducing operation can be carried out. To accurately guide the tape along the tape running paths by suppressing shifting of the tape in its widthwise direction in the tape running paths, pad members 6 are provided which press the magnetic tape T against the above-described guide pins or rollers 6 under a substantially constant pressure at all times.

Since the space in the above-described small magnetic tape cassette is limited, it is difficult to provide in the cassette not only a locking mechanism for the turnable cover 7 but also a mechanism for maintaining the turnable cover 7 closed. Even if a space for providing such mechanism were forcibly made available in the cassette, it would be necessary to miniaturize the components forming these mechanisms and accordingly the efficiency of assembling the cassette would be greatly decreased. In these points, the conventional small magnetic tape cassette is disadvantageous.

FIGS. 2 and 3 show an example of a turnable cover locking mechanism 20 which is employed extensively in a conventional normal size cassette which has a relatively larger amount of available space in it. This locking mechanism 20 shown in FIGS. 2 and 3 includes an L-shaped locking lever 22 which is rockable around a shaft 21 which extends upwardly from the inside bottom 1b of the cassette casing 1. Two upwardly extending pins 23 and 24 are provided between the shaft 21 and the tape running path defined by the guide pin or roller 5. A coil spring 25 is disposed around one of the two pins, namely, the pin 23, with one end of the coil spring rockably urging the locking lever 22 towards the side wall 7a of the turnable cover 7 while the other end of the coil spring abuts the other pin 24. The end portion of the locking lever 22, which is bent in the form of the character "L" towards the side wall 7a, is swung into an engaging hole 26 in the turnable cover 7 which is formed in front of a supporting rod 8 of the turnable cover 7 to prevent the cover 7 from being opened.

If a depressing member (not shown) is inserted from outside into an opening 27 in the side wall 7a which is formed between the supporting rod 8 and the engaging hole 26, the depressing member acts against the elastic force of the coil spring to depress one side of a stopper 28 which is provided on one side of the locking lever, and the end portion of the locking lever 22 is swingably displaced to the position indicated by the broken line. Thus, the end portion is disengaged from the engaging hole 26 so that the turnable cover 7 can be opened.

In order to provide the above-described locking mechanism 20 in the cassette, it is necessary to provide a space for arranging the pins 23 and 24 and the coil spring 25 between the locking lever 22 and the tape running path. If this space is in fact provided, the miniaturization of the entire cassette becomes quite difficult. Furthermore, with this construction, if the locking lever is displaced towards the position indicated by the broken line, it may strike the tape T near the above-described guide pin or roller 5 thus damaging the tape T.

Accordingly, an object of the invention is to provide a magnetic tape cassette in which all of the above-described difficulties accompanying the locking mechanism of a conventional magnetic tape cassette are eliminated and which has a relatively low manufacturing cost.

SUMMARY OF THE INVENTION

The foregoing object and other objects of the invention have been achieved by the provision of a magnetic tape cassette having a locking mechanism which, according to the invention, includes a rotary shaft, a locking lever extending from the rotary shaft, a stop extending from the rotary shaft in a direction substantially opposite to the direction of extension of the locking lever, and a coil spring having one end portion a conventional locking mechanism thereof locked to the rotary shaft, the coil portion thereof disposed around the rotary shaft and the other end portion thereof abutted against the inner surface of a locking mechanism for a side wall of the cassette casing.

More specifically, the invention provides a magnetic tape cassette having a locking mechanism including a supporting shaft fixed to a bottom wall of the cassette casing, a rotary hub rotatably mounted on the supporting shaft, a locking lever extending from one side of the hub, a first stop extending from the hub in a direction substantially opposite to the direction of extension of the locking lever, and a coil spring. The coil spring has a first end portion thereof locked to the hub, a coil portion disposed around the hub, and a second end portion abutted against an inner surface of a side wall of the cassette casing. Preferably, the hub has an upper portion having a slit formed therein with the coil portion of the coil spring disposed around the upper portion with the second end portion of this spring disposed in the slit. A hole may be formed in the cassette casing for insertion therethrough of a depressing member tool for depressing the locking lever.

DESCRIPTION OF THE PREFERRED EMBODIMENTS

A preferred embodiment of a magnetic tape cassette according to the invention will be described with reference to the accompanying drawings.

Figure 1:
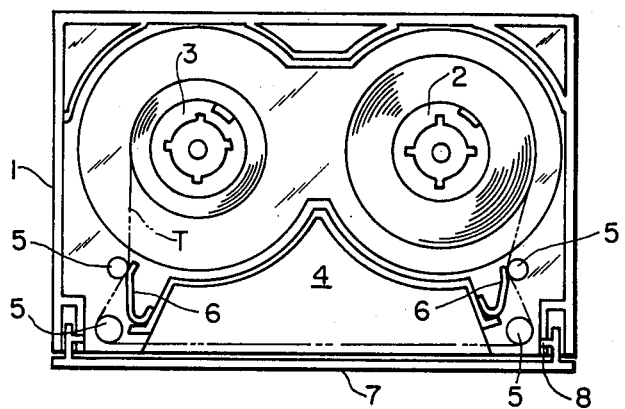
FIG. 1 is a plan view showing the interior of a conventional small cassette.
Figure 2:
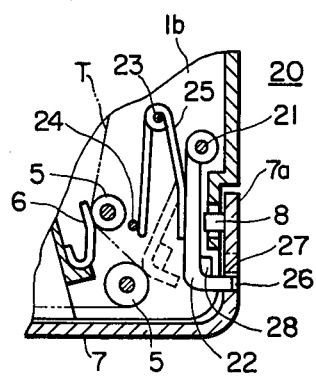
FIGS. 2 and 3 are a plan view and a perspective view, respectively, showing an example of essential portions of the conventional small cassette.
Figure 3:
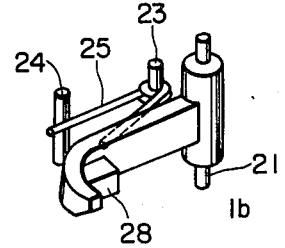

The magnetic tape cassette of the invention is similar to the conventional cassette shown in FIG. 1 except for the locking mechanism. Therefore, no description will be hereafter given in components which are employed commonly in both cassettes.

Figure 4:
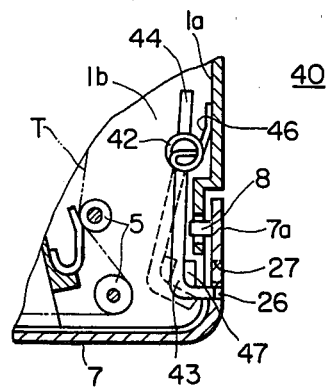
FIGS. 4 and 5 are a plan view and a perspective view, respectively, showing essential portions of a magnetic tape cassette according to the invention.
Figure 5:
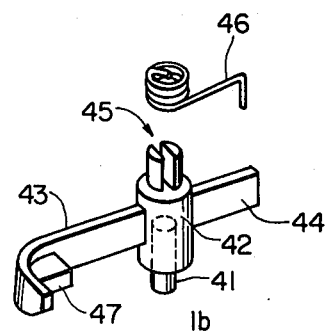

FIGS. 4 and 5 show a locking mechanism 40 for a turnable cover 7 of a video cassette constructed according to the invention. The locking mechanism 40 includes a rotary hub 42 which is rotatably fitted on a supporting shaft 41 which protrudes from the inside bottom 1b of the cassette casing 1, an L-shaped locking lever 43 extending from the hub 42, a stop 44 which extends from the rotary shaft 42 in a direction substantially opposite to the direction of extension of the locking lever 43, and a coil spring 46. One end portion of the coil spring is inserted and locked in a slit 45 which is formed by dividing the upper end portion of the hub 42 into two parts. The coil portion of the coil spring is disposed around the cylindrical upper end portion of the rotary shaft 42 and the other end portion abuts against the inner surface of the side wall of the cassette casing 1.

The torsional force of the coil spring 46 is imparted through the slit 45 and the hub 42 to the locking lever 43 so that the lever 43 is swingably urged towards the side wall 7a of the turnable cover 7 whose supporting rod 8 is inserted into the side wall of the cassette casing 1. As described above, the end portion of the locking lever 43, which is urged towards the side wall 7a of the turnable cover 7, is bent in the form of the character "L." Therefore, the end portion of the locking lever 43 is maintained inserted into the engaging hole 26 formed in the side wall 7a thus preventing the turnable cover 7 from being opened.

An opening 27 is formed between the supporting rod 8 and the engaging hole 26 in the side wall 7a of the turnable cover 7. A depressing member (not shown) can be inserted from the outside into the opening 27 to abut against a stop 47 which is formed on one side of the locking lever 43. When the depressing member is further inserted against the elastic force of the coil spring 46, the locking lever 43 is swung towards the position indicated by the broken line so that the end portion of the locking lever 43 is disengaged from the engaging hole and accordingly the turnable cover 7 can be opened.

When the locking lever 43 is further swung towards the position indicated by the broken line, the stop 44 abuts against the inner surface 1a of the side wall of the cassette casing 1 to stop the swing of the locking lever 43. The other stop 47 serves as a swingable displacement stopping member also when the locking lever 43 is displaced to lock the turnable cover 7.

In the locking mechanism of the cassette according to the invention, the elastic force of the spring is applied directly to the rotary shaft 42, and the stop 44 extends from the rotary shaft 42 in a direction opposite to the direction of extension of the locking lever 43 so that the locking lever 43 is forced in one direction, and the swing of the locking lever in the opposite direction is limited. Accordingly, it is unnecessary to provide members of the locking mechanism in the space between the locking lever 43 and the tape running path. Furthermore, swinging the locking lever 43 more than required is prevented by suitably determining the angle of protrusion of the stop 44. Thus, according to the invention, the amount of internal space in the cassette is reduced which contributes to a miniaturization of the cassette.

Since the above-described locking mechanism 40 is relatively compact, the efficiency of cassette assembly is high and a magnetic tape cassette of low price is provided with the use of the invention.

In addition, it should be noted that the locking mechanism 40 according to the invention is applicable to an ordinary size cassette as well as a miniaturized cassette.

What is claimed is:

1. A magnetic tape cassette in which a magnetic tape wound on a pair of hubs in a hollow interior of a cassette casing is guided to run across a front opening formed in said casing and can be pulled out of said front opening, and including a locking mechanism comprising:
   a supporting shaft fixed to a bottom wall of said cassette casing;
   a rotary hub rotatably mounted on said supporting shaft;
   a locking lever extending from said rotary hub for rotating with said rotary hub;
   a first stop extending from said hub in a direction substantially opposite to a direction of extension of said locking lever, said first stop rotating with said locking lever;
   means for limiting a range of rotation of said first stop to limit a range of rotation of said locking lever as said locking lever rotates with said rotary hub; and
   a coil spring having a first end portion thereof locked to said hub, a coil portion thereof disposed around said hub and a second end portion thereof abutted against an inner surface of a side wall of said cassette casing.

2. The magnetic tape cassette of claim 1 wherein said hub has an upper portion around which said coil portion of said coil spring is disposed, said upper portion of said hub having a slit formed therein with said first end portion of said coil spring inserted in said slit.

3. The magnetic tape cassette of claim 1 wherein said locking lever is L-shaped.

4. The magnetic tape cassette of claim 3 further comprising a second stop mounted on said locking lever at a bend thereof.

5. The magnetic tape cassette of claim 1 wherein a hole is formed in said cassette casing adapted for insertion therethrough of a depressing member for depressing said locking lever.

6. The magnetic tape cassette of claim 1 wherein said rotation limiting means and said first stop prevent said locking lever from contacting said tape located in said cassette as said locking lever is rotated to release a turnable cover.

7. The magnetic tape cassette of claim 6 wherein said rotation limiting means comprises said inner face of said side wall of said cassette casing.

* * * * *